(12) United States Patent
Zhang et al.

(10) Patent No.: US 11,330,459 B2
(45) Date of Patent: May 10, 2022

(54) GAP SHARING FOR RLM IN NR

(71) Applicant: Nokia Technologies Oy, Espoo (FI)

(72) Inventors: Li Zhang, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 63 days.

(21) Appl. No.: 16/764,499

(22) PCT Filed: Nov. 17, 2017

(86) PCT No.: PCT/CN2017/111628
§ 371 (c)(1),
(2) Date: May 15, 2020

(87) PCT Pub. No.: WO2019/095277
PCT Pub. Date: May 23, 2019

(65) Prior Publication Data
US 2020/0359246 A1    Nov. 12, 2020

(51) Int. Cl.
*H04W 24/10* (2009.01)
*H04L 5/00* (2006.01)
(Continued)

(52) U.S. Cl.
CPC ............ *H04W 24/10* (2013.01); *H04L 5/005* (2013.01); *H04W 24/08* (2013.01); *H04W 28/0268* (2013.01); *H04W 56/001* (2013.01)

(58) Field of Classification Search
None
See application file for complete search history.

(56) References Cited

U.S. PATENT DOCUMENTS

2015/0245235 A1\* 8/2015 Tang ................ H04W 72/0406
370/252
2015/0327286 A1    11/2015 Yiu et al.
(Continued)

FOREIGN PATENT DOCUMENTS

GN        106664539 A      5/2017
WO        2017/080229 A1   5/2017

OTHER PUBLICATIONS

"3rd Generation Partnership Project;Technical Specification Group Radio Access Network;Evolved Universal Terrestrial Radio Access (E-UTRA); Requirements for support of radio resource management(Release 15)", 3GPP TS 36.133, V15.0.0, Sep. 2017, pp. 1-2663.

(Continued)

*Primary Examiner* — Ayanah S George
(74) *Attorney, Agent, or Firm* — Brake Hughes Bellermann LLP

(57) ABSTRACT

An apparatus and a method are provided, by which a measurement gap sharing scheme is generated by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements; measurements including the radio link monitoring measurement, the intra-frequency measurement and inter-frequency measurement are performed according to the measurement gap sharing scheme, and the measurement gap sharing scheme between radio link monitoring measurement, intra-frequency measurement and inter-frequency measurement is changed based on the radio link quality of a serving cell.

20 Claims, 1 Drawing Sheet

(51) Int. Cl.
    *H04W 24/08*     (2009.01)
    *H04W 28/02*     (2009.01)
    *H04W 56/00*     (2009.01)

(56) References Cited

U.S. PATENT DOCUMENTS

| | | | | |
|---|---|---|---|---|
| 2016/0248533 | A1* | 8/2016 | Li | H04J 11/0073 |
| 2017/0055174 | A1* | 2/2017 | Siomina | H04W 24/10 |
| 2020/0137601 | A1* | 4/2020 | Siomina | H04W 24/10 |
| 2020/0344019 | A1* | 10/2020 | Da Silva | H04B 7/0626 |

OTHER PUBLICATIONS

"3rd Generation Partnership Project;Technical Specification Group Radio Access Network;Evolved Universal Terrestrial Radio Access (E-UTRA);Radio Resource Control (RRC); Protocol specification(Release 14)", 3GPP TS 36.331, V14.4.0, Sep. 2017, pp. 1-753.

"3rd Generation Partnership Project;Technical Specification Group Radio Access Network;Evolved Universal Terrestrial Radio Access (E-UTRA);Physical layer procedures (Release 14)", 3GPP TS 36.213, V14.4.0, Sep. 2017, pp. 1-462.

International Search Report and Written Opinion received for corresponding Patent Cooperation Treaty Application No. PCT/CN2017/111628, dated Aug. 9, 2018, 9 pages.

"Gapsharing due to RSTD measurements for Rel-14 MTC in CEModeA", 3GPP TSG-RAN4 Meeting #84, R4-1707776, Ericsson, Aug. 21-25, 2017, 11 pages.

Office action received for corresponding Japanese Patent Application No. 2020-526960, dated May 25, 2021, 4 pages of office action and 6 pages of Translation available.

"On RSTD requirements for FeMTC", 3GPP TSG RAN WG4 Meeting #83, Ericsson, R4-1705603, Agenda Item: 7.18 3.1.2, May 15-19, 2017, 5 pages.

"The needs of Measurement Gap in NR", 3GPP TSG-RAN WG4 Meeting #84bis, MediaTek Inc., Agenda item: 9.7.4.2, R4-1710670, Oct. 9-13, 2017, 6 pages.

Extended European Search Report received for corresponding European Patent Application No. 17931850.6, dated Jun. 2, 2021, 6 pages.

Office action received for corresponding Indian Patent Application No. 202047024772, dated Jun. 25, 2021, 6 pages.

"Remaining Details of Type I and Type II CSI Codebooks", 3GPP TSG RAN WG1 NR Ad-Hoc#2, R1-1710670, Agenda : 5.1.2.3.4, Samsung, Jun. 27-30, 2017, 6 pages.

\* cited by examiner

GAP SHARING FOR RLM IN NR

RELATED APPLICATION

This application was originally filed as PCT Application No. PCT/CN2017/111628, filed on Nov. 17, 2017, each of which is incorporated herein by reference in its entirety.

FIELD OF THE INVENTION

The present invention relates to an apparatus, a method and a computer program product by which gap sharing for radio link monitoring (RLM) in NR (New Radio) is enabled.

RELATED BACKGROUND ART

The following meanings for the abbreviations used in this specification apply:
3GPP 3rd Generation Partnership Project
BW Bandwidth
BWP Bandwidth part
CGI Cell global identifier
CRS Common reference signal
CSI-RS Channel state information reference signal
DRX Discontinuous reception
E-UTRA Evolved universal terrestrial radio access
L1 Layer 1
L3 Layer 3
LTE Long Term Evolution (4G)
NR New Radio
PBCH Physical broadcast channel
PCell Primary cell
PSCell Primary SCell
PSS Primary synchronization signal
RLM Radio link monitoring
RRC Radio resource control
RRM Radio resource management
SCell Secondary cell
SSB Synchronization signal block
SSS Secondary synchronization signal
UE User equipment Embodiments of the present invention, although not limited to this, relate to New Radio (NR). Currently, RAN4 is discussing RLM requirements for NR. As RAN1. agreed, RLM in NR can be based on SSB or CSI-RS. In the present application, it is focused on SSB based RLM as UE compliant to R15 early drop (i.e. UE implemented based on December 17 version of R15 NR spec) can only support RLM based on SSB.

In RAN4 #84bis, RAN4 discussed if UE may need measurement gaps to perform RLM and if corresponding requirement should be defined. As UE may be configured to work in a bandwidth part (BWP) that may not contain the SSB for RLM, it is common view in RAN4 that gaps are needed under certain network configurations, and the UE requirements (e.g. evaluation time for UE to detect the link quality changes) are needed.

NR RLM is in high level similar to LTE RLM. In particular, the UE will monitor the link quality in L1, and if the link quality is below a certain threshold (Qout), L1 will indicate out-of-sync to L3. A timer would then be started on L3 (in LTE T310) to allow link recovery, i.e. if UE monitors the link quality to be above another threshold (Qin) before the timer expires, UE will consider the link as recovered and go back to normal mode, otherwise (if timer expires), RLF and predefined actions e.g. re-establishment will be triggered.

Using measurement gap for RLM is new issue in NR as in LTE the RLM is based on CRS which is transmitted across the whole cell BW (so UE does not to re-tune to monitor CRS). The issue is further complicated by the fact that intra-frequency RRM measurement in NR may also rely on gaps for the same reason, e.g. UE may be configured to work in a bandwidth part (BWP) that may not contain the SSB for intra-frequency measurement.

SUMMARY OF THE INVENTION

Embodiments of the present invention address this situation and aim to enable RLM measurements of a UE in such a scenario.

According to a first aspect of the present invention an apparatus is provided which comprises at least one processor, at least one memory including computer program code, and the at least one processor, with the at least one memory and the computer program code, being arranged to cause the apparatus to at least generate a measurement gap sharing scheme by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements, perform measurements including the radio link monitoring measurement, the intra-frequency measurement and inter-frequency measurement according to the measurement gap sharing scheme, and change the measurement gap sharing scheme between radio link monitoring measurement, intra-frequency measurement and inter-frequency measurement based on the radio link quality of a serving cell.

According to a second aspect of the present invention, a method is provided which comprises:
generating a measurement gap sharing scheme by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements,
performing measurements including the radio link monitoring measurement, the intra-frequency measurement and inter-frequency measurement according to the measurement gap sharing scheme, and
changing the measurement gap sharing scheme between radio link monitoring measurement, intra-frequency measurement and inter-frequency measurement based on the radio link quality of a serving cell.

The first aspect and the second aspect may be modified as follows:

For example, the measurement gap sharing scheme may be generated such that the measurement gaps shared by the radio link monitoring and intra-frequency measurements are not used by the inter-frequency measurement.

The the measurement gap sharing scheme may be generated such that the same measurement gaps are used for the radio link monitoring measurement and the intra-frequency measurement if the radio link monitoring reference signals for the radio link monitoring and synchronization signal block and/or other reference signal for intra-frequency measurements are on the same carrier frequency.

Moreover, same measurement requirements may be applied for both of the radio link monitoring measurement and the intra-frequency measurement.

The measurement gap sharing scheme may be generated such that the radio link monitoring measurement and the intra-frequency measurement share measurement gaps not used for the inter-frequency measurement if the radio link monitoring reference signals for radio link monitoring and synchronization signal block and/or other reference signal for intra-frequency measurement are on different carrier frequencies.

The number of gaps used for radio link monitoring measurement may be increased in case it is detected that the link quality is not sufficient.

The number of gaps to be used for radio link monitoring measurement may be increased to a maximum allowed number of gaps for intra-frequency measurement in case it is detected that the link quality is not sufficient.

The gap sharing may be canceled and all the gaps may be used for radio link monitoring in case it is detected that the link quality is not sufficient.

It may be reported to the network that it has been detected that that the link quality is not sufficient, and that the measurement gap sharing scheme has been changed.

It may be detected that the link quality is not sufficient by determining whether a link quality is below a certain threshold.

Furthermore, when, after the measurement gap scheme has been changed due to a low radio link quality it is detected that the radio link quality is recovered, it may be returned to the measurement gap scheme which was applied before detecting the low radio link quality.

A change of the gap sharing scheme when radio link quality changes may be network configurable.

According to a third aspect of the present invention a computer program product is provided which comprises code means for performing a method according to the second aspect and/or its modifications when run on a processing means or module. The computer program product may be embodied on a computer-readable medium, and/or the computer program product may be directly loadable into the internal memory of the computer and/or transmittable via a network by means of at least one of upload, download and push procedures.

According to a fourth aspect of the present invention an apparatus is provided which comprises
  means for generating a measurement gap sharing scheme by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements,
  means for performing measurements including the radio link monitoring measurement, the intra-frequency measurement and inter-frequency measurement according to the measurement gap sharing scheme, and means for changing the measurement gap sharing scheme between radio link monitoring measurement, intra-frequency measurement and inter-frequency measurement based on the radio link quality of a serving cell.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

Figure 2:
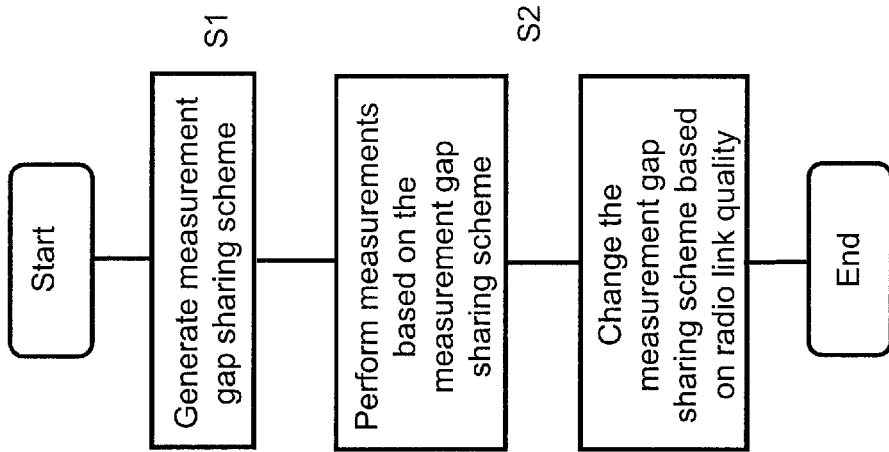
FIG. 2 shows a flowchart of a procedure carried out by a UE according to an embodiment of the present invention.

In the following, description will be made to embodiments of the present invention. It is to be understood, however, that the description is given by way of example only, and that the described embodiments are by no means to be understood as limiting the present invention thereto.

Before describing embodiments, however, the problem underlying the present application is described in some more detail.

As described above, using measurement gap for RLM is a new issue in NR. Moreover, in NR the intra-frequency RRM measurement may also rely on gaps. In RAN4 #84bis, it is already agreed that measurement gaps will be shared between intra- and inter-frequency measurements, with the sharing factor configurable by the network.

Thus, the problem to be solved is how to share the gaps when RLM is also based on gaps and the limited number of gaps needs to be shared for multiple purposes: intra frequency and inter-frequency measurements and RLM measurements.

In LTE, in order to allow timely recovery when the radio link quality gets better, the RLM monitoring requirement is always based on non-DRX once the Qout message is sent to upper layers (RRC), even when UE is in DRX (UE monitoring requirement in DRX is more relaxed compared to non-DR requirement to enable power saving).

This is derivable from chapter 7.6.2.2 of TS 36.133 (V15.0.0 (2017-09)), for example:

"7.6.2.2 Minimum requirement when DRX is used

When DRX is used the $Q_{out}$ evaluation period ($T_{Evaluate\_Q_{out\_DRX}}$) and the $Q_{in}$ evaluation period ($T_{Evaluate\_Q_{in\_DRX}}$) specified in Table 7.6.2.2-1 will be used.

When higher-layer signalling indicates certain subframes for restricted radio link monitoring, the $Q_{out}$ evaluation period ($T_{Evaluate\_Q_{out\_DRX}}$) and the $Q_{in}$ evaluation period ($T_{Evaluate\_Q_{in\_DRX}}$) specified in Table 7.6.2.2-2 will be used.

When eDRX_CONN cycle is used, the $Q_{out}$ evaluation period ($T_{Evaluate\_Q_{out\_DRX}}$) and the $Q_{in}$ evaluation period ($T_{Evaluate\_Q_{in\_DRX}}$) specified in Table 7.6.2.2-3 will be used.

When the UE creates autonomous gaps for identification the CGI of an E-UTRA intra-frequency cell or an E-UTRA inter-frequency cell and when higher-layer signalling indicates certain subframes for restricted radio link monitoring, the UE shall also perform radio link monitoring. In this case, the $Q_{out}$ evaluation period ($T_{Evaluate\_Q_{out\_DRX}}$) and the $Q_{in}$ evaluation period ($T_{Evaluate\_Q_{in\_DRX}}$) specified in Table 7.6.2.2-2 will be used[Note 1]. (Note 1: This RLM requirement does not need to be tested.)

When the downlink radio link quality of the PCell or PSCell estimated over the last $T_{Evaluate\_Q_{out\_DRX}}$ [s] period becomes worse than the threshold $Q_{out}$, Layer 1 of the UE shall send out-of-sync indication for the PCell or PSCell to the higher layers within $T_{Evaluate\_Q_{out\_DRX}}$ [s] evaluation period. A Layer 3 filter shall be applied to the out-of-sync indications as specified in TS 36.331.

When the downlink radio link quality of the PCell or PSCell estimated over the last $T_{Evaluate\_Q_{in\_DRX}}$ [s] period becomes better than the threshold $Q_{in}$, Layer 1 of the UE shall send in-sync indications for the PCell or PSCell to the higher layers within $T_{Evaluate\_Q_{in\_DRX}}$ [s] evaluation period. A L3 filter shall be applied to the in-sync indications as specified in TS 36.331.

The out-of-sync and in-sync evaluations of the PCell or PSCell shall be performed as specified in clause 4.2.1 in 3GPP TS 36.213. When DRX is used, two successive indications from Layer 1 shall be separated by at least max(10 ms, DRX_cycle_length). When the UE is configured with dual connectivity, then two successive indications from Layer 1 shall be separated by at least max(10 ms, MCG_DRX_cycle_length) for PCell and by at least max(10 ms, SCG_DRX_cycle_length) for PSCell. When eDRX_CONN is used, two successive indications from Layer 1 shall be separated by at least max(10 ms, eDRX_CONN cycle length).

Upon start of T310 timer or T313 timer as specified in clause 5.3.11 in TS 36.331, the UE shall monitor the link of PCell or PSCell for recovery using the evaluation period and Layer 1 indication interval corresponding to the non-DRX mode until the expiry or stop of T310 timer or T313 timer.

The transmitter power of the UE shall be turned off within 40 ms after expiry of T310 timer and the transmitter power of PSCell if configured shall be turned off within 40 ms after expiry of T313 timer as specified in clause 5.3.11 in TS 36.331. The UE shall not perform LBT procedure on any of FS3 SCells after the expiry of T310."

Embodiments of the present invention aim to enable sharing measurement gaps for RLM measurements.

In the following, a general overview of an embodiment of the present invention is described by referring to FIGS. 1 and 2.

Figure 1:
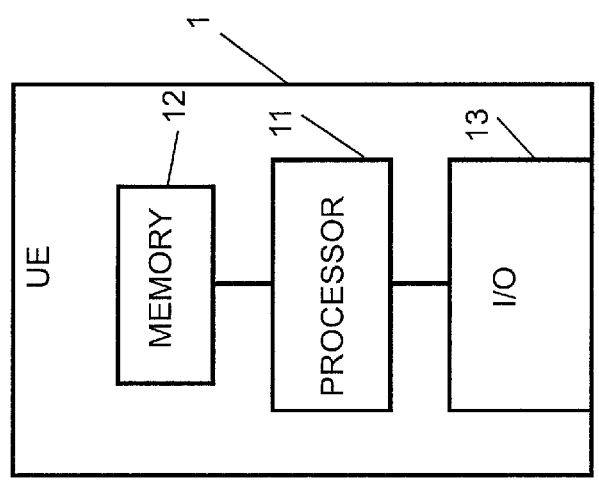
FIG. 1 shows a UE according to an embodiment of the present invention.

In particular, FIG. 1 shows a UE 1 as an example for an apparatus according to the present embodiment. The UE 1 comprises at least one processor 11 and at least one memory 12 including computer program code. The at least one processor 11, with the at least one memory 12 and the computer program code, is arranged to cause the apparatus at least to generate a measurement gap sharing scheme by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements, and perform measurements including the radio link monitoring measurement, the intra-frequency measurement and inter-frequency measurement according to the measurement gap sharing scheme.

In other words, by referring to the flowchart shown in FIG. 2, in step S1, a measurement gap sharing scheme is generated by sharing measurement gaps between radio link monitoring measurement, intra-frequency measurement and inter-frequency measurement based on configurations of radio link monitoring reference signals for radio link monitoring and synchronization signal blocks and/or other reference signals used for intra-frequency measurements. In step S2, measurements including the radio link monitoring measurement, the intra-frequency measurement and inter-frequency measurement are performed according to the measurement gap sharing scheme.

Thus, according to embodiments of the present invention, a measurement sharing scheme is provided in which measurement gaps are shared by the radio link monitoring (RLM) measurement and the intra-frequency measurement. That is, each measurement gap is used by both the radio link monitoring measurement and the intra-frequency measurement. In this way, a high number of measurement gaps can be used for two kinds of measurements simultaneously, so that the available measurement gaps can be used efficiently.

The measurement gaps that are not shared by the RLM and intra-frequency measurements may be used by the inter-frequency measurement. In other words, the measurement gaps may be configured such that those gaps that are not used for the inter-frequency measurement are shared by the RLM and intra-frequency measurements.

Furthermore, the measurement gap sharing scheme between radio link monitoring measurement, intra-frequency measurement and inter-frequency measurement may be changed based on the radio link quality of a serving cell.

The UE 1 may further comprise input/output (I/O) units or functions (interfaces) 13 connected to the processor 11. In particular, the I/O units or functions 13 may comprise a receiver/transmitter unit.

It is noted that the SSB (synchronization signal block) transmits primary Synchronization Signals (PSS) and Secondary Synchronization Signals (SSS) together with the Physical Broadcast Channel (PBCH). The blocks are transmitted per slot at a fixed slot location at regular intervals.

Intra-frequency measurements are measurements at the downlink carrier frequency(ies) of the serving cell(s).

Inter-frequency measurements are measurements at frequencies that differ from any of the downlink carrier frequency(ies) of the serving cell(s).

Moreover, RLM measurement is performed on RLM reference signals, which can be configured as SSB or other reference signal. Thus, it is noted that embodiments of the present application are not restricted to only SSB based RLM. Intra-frequency measurement can be also configured to be based on SSB or other reference signal, but the signals used for RLM and intra-frequency measurement are configured independently.

In the following, some more details of embodiments of the present invention are described.

According to the detailed embodiments, a measurement gap sharing scheme to allow reasonable measurement performance for intra-frequency, inter-frequency and RLM is proposed. It includes the following principles.

First, the gap sharing aspect is described:

If SSBs for RLM and intra-frequency measurement are same, or SSBs for one purpose is a subset of SSBs for the other (i.e., the SSBs or reference signals for one of the RLM measurement and the intra-frequency measurement are on the same carrier frequency and can be measured with a single measurement gap pattern), the same gap is used for both purposes, and same measurement requirement apply to both.

If SSBs for RLM and intra-frequency measurement are on different carrier frequencies (but the union of the SSBs for RLM and intra-frequency measurement can be covered by a single gap pattern), RLM and intra-frequency measurement would equally share the gaps not used for inter-frequency measurement. This means the measurement performance will be scaled by a factor of 2.

In other words, since the shared measurement gaps can be used by both RLM and intra-frequency measurements, the number of gaps used for the two kinds of measurements is reduced.

Once L1 indicates that out-of-sync is detected (e.g., when detected that the link quality is below a certain threshold (Qout)), the following is carried out:

In both cases described above, when UE L1 indicates out-of-sync and the L3 timer for out-of-sync (which is called T310 in LTE) is started, the gap sharing among intra-frequency, inter-frequency and RLM is changed such that more gaps are used for RLM. One example is that all gaps are used for RLM measurement. Another example is that the maximum allowed gap sharing for intra-frequency measurement is used, and the exact network configuration is ignored.

In one approach, such gap sharing behaviour could be network configurable while in another approach it could be fixed UE behaviour.

Alternatively, the all gap sharing is cancelled once out-of-sync is detected—even before L3 timer is started. Such alternative could even be network configurable.

That is, in other words, when out-of-sync is detected, no gap sharing is applied and only RLM measurements are carried out in all available gaps.

In one aspect, the UE could even trigger reporting to the network once such event happens on UE side (out-of-sync is detected and gap sharing rule is changed). This would enable network to perform possible actions if needed.

According to a further embodiment, it may be detected that the link quality is not sufficient by determining whether a link quality is below a certain threshold. That is, for example the UE 1 monitors the link quality in L1, and if the link quality is below a certain threshold (e.g. Qout), L1 will indicate out-of-sync to L3.

Moreover, the UE may, when, after the measurement gap scheme has been changed due to a low radio link quality it is detected that the radio link quality is recovered, return to the measurement gap scheme which was applied before detecting the low radio link quality.

For example, when, after detecting that the link quality is below the certain threshold, it is detected that the link quality exceeds another threshold (e.g. Qin) which is higher than the certain threshold for determining the llik quality is not sufficient, the UE may consider the link as recovered. Then, the original measurement gap sharing scheme can be applied again, which was applied before a problem in the radio link quality was detected. This determination may also be performed by using a timer which is started in L3 after the out-of-sync was received from L1.

Moreover, according to some embodiments of the present invention, the change of the gap sharing scheme when radio link quality changes may be network configurable.

Thus, the proposed scheme allows sharing a single measurement gap pattern for intra-frequency, inter-frequency and RLM measurement. RLM specific gap can be avoided.

Moreover, the re-sharing of gaps with more gap used for RLM when out-of-sync timer starts can allow timely link recovery, as otherwise UE may not be able to timely detect the link recovery due to insufficient measurement opportunity.

The invention is not limited to the specific embodiments described above, and various modifications are possible.

For example, in the above embodiments, the gap sharing scheme was described for NR. However, the scheme can be applied to any radio technique, as along as the gap sharing scheme can be configured based on synchronization signal blocks. In particular, the scheme may also be applied in LTE.

In general, various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory 12 may be of any type suitable to the local technical environment and may be implemented using any suitable data storage technology, such as semiconductor based memory devices, magnetic memory devices and systems, optical memory devices and systems, fixed memory and removable memory. The processor 11 may be of any type suitable to the local technical environment, and may include one or more of general-purpose computers, special purpose computers, microprocessors, digital signal processors (DSPs) and processors based on a multi core processor architecture, as non-limiting examples.

Further, as used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. An apparatus, comprising at least one processor, at least one memory including computer program code, and the at least one processor, with the at least one memory and the computer program code, being arranged to cause the apparatus to at least:

provide a measurement gap sharing scheme by sharing measurement gaps between a radio link monitoring measurement, an intra-frequency measurement and an inter-frequency measurement based on a configuration of radio link monitoring reference signals for the radio link monitoring measurement and a configuration of synchronization signal blocks and/or other reference signals used for the intra-frequency measurement; and perform measurements including the radio link monitoring measurement, the intra-frequency measurement and the inter-frequency measurement based on the measurement gap sharing scheme;

wherein the measurement gap sharing scheme is determined based on whether the synchronization signal blocks are a subset of the radio link monitoring reference signals.

2. The apparatus according to claim 1, wherein the measurement gap sharing scheme between the radio link monitoring measurement, the intra-frequency measurement and the inter-frequency measurement is changed based on a radio link quality of a serving cell.

3. The apparatus according to claim 1, wherein the measurement gap sharing scheme is generated such that the measurement gaps shared by the radio link monitoring measurement and the intra-frequency measurement are not used by the inter-frequency measurement.

4. The apparatus according claim 1, wherein the measurement gap sharing scheme is generated such that the same measurement gaps are used for the radio link monitoring measurement and the intra-frequency measurement, if the synchronization signal blocks and the other reference signals are on the same carrier frequency.

5. The apparatus according to claim 1, wherein the measurement gap sharing scheme is generated such that the radio link monitoring measurement and the intra-frequency measurement share measurement gaps not used for the inter-frequency measurement, if the synchronization signal blocks and the other reference signals are on different carrier frequencies.

6. The apparatus according to claim 2, wherein the at least one processor, with the at least one memory and the computer program code, is arranged to cause the apparatus further to:
  increase a number of gaps used for the radio link monitoring measurement in case the radio link quality is below a threshold;
  increase the number of gaps to be used for the radio link monitoring measurement to a maximum allowed number of gaps for the intra-frequency measurement in case the radio link quality is below the threshold; or
  cancel the measurement gap sharing scheme and use all gaps for the radio link monitoring measurement in case the radio link quality is below the threshold.

7. The apparatus according to claim 6, wherein the at least one processor, with the at least one memory and the computer program code, is arranged to cause the apparatus further to:
  report to a network that the radio link quality is below the threshold, and that the measurement gap sharing scheme has been changed.

8. The apparatus according to claim 2, wherein the at least one processor, with the at least one memory and the computer program code, is arranged to cause the apparatus further to:
  when, after the measurement gap scheme has been changed due to a low radio link quality it is detected that the radio link quality is recovered, return to the measurement gap scheme which was applied before detecting the low radio link quality.

9. A method comprising:
  providing a measurement gap sharing scheme by sharing measurement gaps between a radio link monitoring measurement, an intra-frequency measurement and an inter-frequency measurement based on a configuration of radio link monitoring reference signals for radio link monitoring and a configuration of synchronization signal blocks and/or other reference signals used for the intra-frequency measurement; and
  performing measurements including the radio link monitoring measurement, the intra-frequency measurement and the inter-frequency measurement according to the measurement gap sharing scheme;
  wherein the measurement gap sharing scheme is determined based on whether the synchronization signal blocks are a subset of the radio link monitoring reference signals.

10. The method according to claim 9, wherein the measurement gap sharing scheme between the radio link monitoring measurement, the intra-frequency measurement and the inter-frequency measurement is changed based on a radio link quality of a serving cell.

11. The method according to claim 9, wherein the measurement gap sharing scheme is generated such that the measurement gaps shared by the radio link monitoring measurement and the intra-frequency measurement are not used by the inter-frequency measurement.

12. The method according claim 9, wherein the measurement gap sharing scheme is generated such that the same measurement gaps are used for the radio link monitoring measurement and the intra-frequency measurement, if synchronization signal blocks and other reference signals are on the same carrier frequency.

13. The method according to claim 9, wherein the measurement gap sharing scheme is generated such that the radio link monitoring measurement and the intra-frequency measurement share measurement gaps not used for the inter-frequency measurement, if the synchronization signal blocks and/or the other reference signals are on different carrier frequencies.

14. The method according to claim 10, further comprising:
  increasing a number of gaps used for the radio link monitoring measurement in case the radio link quality is below a threshold;
  increasing the number of gaps to be used for the radio link monitoring measurement to a maximum allowed number of gaps for the intra-frequency measurement in case the radio link quality is below the threshold; or
  cancelling the measurement gap sharing scheme and use all gaps for the radio link monitoring measurement in case the radio link quality is below the threshold.

15. The method according claim 14, further comprising:
  reporting to a network that the radio link quality is below the threshold, and that the measurement gap sharing scheme has been changed.

16. The method according to claim 10, further comprising:
  when, after the measurement gap scheme has been changed due to a low radio link quality it is detected that the radio link quality is recovered, returning to the measurement gap scheme which was applied before detecting the low radio link quality.

17. A non-transitory computer-readable storage medium comprising instructions stored thereon that, when executed by at least one processor, are configured to cause an apparatus to perform at least the following:
  provide a measurement gap sharing scheme by sharing measurement gaps between a radio link monitoring measurement, an intra-frequency measurement and an inter-frequency measurement based on a configuration of radio link monitoring reference signals for radio link monitoring and a configuration of synchronization signal blocks and/or other reference signals used for the intra-frequency measurement; and
  perform measurements including the radio link monitoring measurement, the intra-frequency measurement and the inter-frequency measurement according to the measurement gap sharing scheme;

wherein the measurement gap sharing scheme is determined based on whether the synchronization signal blocks are a subset of the radio link monitoring reference signals.

18. The non-transitory computer-readable storage medium according to claim 17, wherein the measurement gap sharing scheme between the radio link monitoring measurement, the intra-frequency measurement and the inter-frequency measurement is changed based on a radio link quality of a serving cell.

19. The non-transitory computer-readable storage medium according to claim 17, wherein the measurement gap sharing scheme is generated such that the measurement gaps shared by the radio link monitoring measurement and the intra-frequency measurement are not used by the inter-frequency measurement.

20. The non-transitory computer-readable storage medium according claim 17, wherein the measurement gap sharing scheme is generated such that the same measurement gaps are used for the radio link monitoring measurement and the intra-frequency measurement, if the synchronization signal blocks and/or the other reference signals are on the same carrier frequency.

* * * * *